Oct. 8, 1963 J. R. FROST 3,106,487
PROCESS FOR IMPARTING PLASTIC RELEASE CHARACTERISTICS TO
POLYTETRAFLUOROETHYLENE AND APPARATUS EMBODYING SAME
Filed May 19, 1960
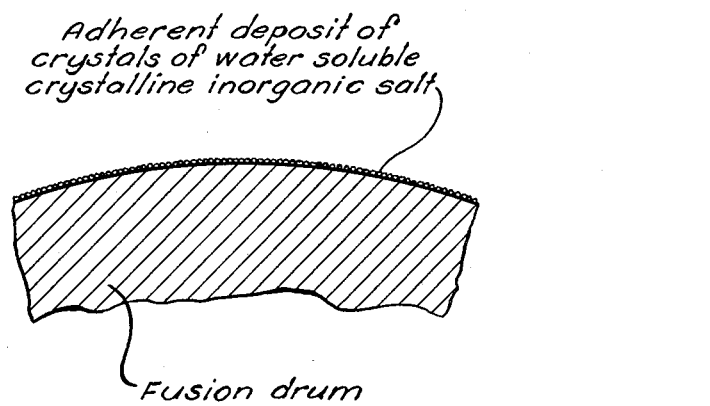
*INVENTOR.*
John R. Frost
BY
*AGENT*

United States Patent Office 3,106,487
Patented Oct. 8, 1963

3,106,487
PROCESS FOR IMPARTING PLASTIC RELEASE CHARACTERISTICS TO POLYTETRAFLUOROETHYLENE AND APPARATUS EMBODYING SAME
John R. Frost, Midland, Mich., assignor to The Dow Chemical Company, Midland, Mich., a corporation of Delaware
Filed May 19, 1960, Ser. No. 30,261
5 Claims. (Cl. 117—138.8)

This invention relates to the fabrication of organic, thermoplastic materials and particularly to the provision of surfaces having good release properties for such materials. More particularly, it relates to devices to which organic, thermoplastic materials do not adhere even when molten.

A common means of fabricating organic, thermoplatsic materials is by shaping from the molten state. In such techniques the material is melted, softened, plastified, or rendered deformable from which state it is shaped into the desired article and is then finally cooled to a non-deformable state. While in the molten state the thermoplastic materials frequently are tacky and tend to stick or adhere to the surfaces of the shaping device. It is very common in the molding art and the practice has become conventional to coat all surfaces of mold which come in contact with the molten resin with a mold release agent. Typical of these are certain compounds, such as sodium stearate; certain silicone oils; and other known lubricous substances. Some thermoplastic materials require release from a hot mold, some from a cold mold. It is generally true that no one mold release agent is universally effective with all thermoplastic materials using all fabricating means with release under all possible conditions. The same is true of other fabricating techniques for thermoplastic materials. One example is a preparation of filamentary microtapes by the continuous localized coagulation of a thermoplastic polymer latex followed by drying and subsequent fusion of the coagulum into the desired microtape. In this fiber-making technique a useful device for causing the fusion of coagulum to microtape is a heated cylindrical fusion drum over which the microporous coagulum is passed in contact until fused. At the point of removal from the fusion drum the microtapes are hot and tend to adhere to the common structural materials which are used for the heat conductive surfaces of the fusion drum. When the prior known release agents were used in this application, there was a slight improvement over an untreated surface but there still was a prohibitive amount of adherence of the fibers. The same situation was true when the surface was coated with a fused coating of polytetrafluoroethylene which is known to have better release properties for some situations than steel and similar substances. It would be desirable to have a suitable release agent for the surface of such fusion drums and similar devices which are in contact with hot thermoplastics, whereby the microtapes would be consistently and dependably released.

Accordingly, it is an object of this invention to provide a surface from which organic, thermoplastic material is readily released. It is a further object to provide such a surface from which the fibers are released even when molten or at least in a tacky state. It is a still further object to provide a method for applying such a surface to a fusion drum or similar device.

The above and related objects are accomplished by means of the method for imparting plastic release characteristics to a solid surface comprising the deposition of an adherent deposit of very small crystals of a water-soluble crystalline, inorganic salt on said surface. The objects are further realized by means of a fiber-treating device having a surface completely covered with a thin adherent deposit of small crystals of said water-soluble, crystalline, inorganic salt.

The present invention is useful with a wide variety of thermoplastic materials. As materials which may be advantageously used, there may be mentioned the normally crystalline, polymeric materials. These comprise the well-known genus of polymers which have a tendency to form crystallites consisting of small segments of a plurality of polymer chains aligned in essentially parallel relationship and held in position by secondary valence forces. It is this genus of materials which has found most utility in the manufacture of synthetic man-made fibers and filaments. Typical of the normally crystalline, polymeric materials falling within the advantageous classification are the polymers and copolymers of at least 70 percent by weight of vinylidene chloride with the remainder composed of one or more other monoethylenically unsaturated comonomers exemplary of which are vinyl chloride, vinyl acetate, vinyl propionate, acrylonitrile, alkyl and aralkyl acrylates having alkyl and aralkyl groups of up to about 8 carbon atoms, acrylic acid, acrylamide, vinyl alkyl ethers, vinyl alkyl ketone, acrolein, allyl esters and ethers, butadiene and chloroprene. Known ternary compositions also may be employed advantageously. Representative of such polymers are those composed of at least 70 percent by weight of vinylidene chloride with the remainder made up of, for example, acrolein and vinyl chloride, acrylic acid and acrylonitrile, alkyl acrylates and alkyl methacrylates, acrylonitrile and butadiene, acrylonitrile and itaconic acid, acrylonitrile and vinyl acetate, vinyl propionate, or vinyl chloride, allyl esters or ethers and vinyl chloride, butadiene and vinyl acetate, vinyl propionate, or vinyl chloride and vinyl ethers and vinyl chloride. Quaternary polymers of similar monomeric composition will also be known. It has been found that the normally crystalline copolymers composed of from about 92 to 99 percent by weight of vinylidene chloride and correspondingly from 8 to 1 percent by weight of acrylonitrile or of lower alkyl acrylates have suitable polymerization characteristics, are well adapted for use in the manipulative steps in this process, and result in exceptionally useful filamentary articles. For the listed reasons these vinylidene chlorideacrylonitrile and vinylidene chloride/lower alkyl acrylate copolymers represent preferred species for use with the plastic release concept of the present invention. It should be understood, however, that the process is not limited to the treatment of normally crystalline polymers but that any non-elastic, polymeric material, including, for example, polyvinyl chloride and polystyrene, may be used with the plastic release surface. The polymeric materials may also include minor amounts of monomers, such as vinyl pyrrolidone, vinyl oxazolidinone, vinyl alkyl oxazolidinone, and the like, which are known to aid the dye-receptivity and other properties of fibrous materials without adversely disturbing the release properties. Also operable in the present method are tapes of polymeric materials, such as the polyolefins, including, for example, polyethylene, polypropylene, copolymers of ethylene and propylene, and polyisobutylene. Equally useful in the method are the condensation polymers, such as the polyamides, including polyhexamethylene, diadipamide, and the polyesters, including polyethyelneterephthalate.

Although the present device finds utility in a wide diversity of applications, it is of a special advantage in a continuous process involving the fusion of continuous filaments, fibers, microtapes, and similar articles of thermoplastic polymers. In such an application a relatively cold, unfused filamentary article is continuously brought to bear against a hot fusion surface with the contact of fusion surface and filamentary article continued until fusion is completed. At that time the fused filamentary article while still hot is stripped from the fusion drum. A common and convenient device for achieving this objective is a cylindrical drum which may be internally heated to provide the needed energy to cause fusion of the filamentary article. In addition, it is sometimes required to employ radiant heaters opposite the cylindrical surface to achieve the fusion in the relatively small space available. Other devices and applications where similar problems arise will be apparent to the skilled worker.

It has now been found that when the contacting surface of such fusion drums and like articles is covered with a thin layer of small crystals of a water-soluble crystalline, inorganic salt, ready release of the fused filaments from the fusion drum is attained. Representative examples of the useful water-soluble, crystalline, inorganic salts include monosodium phosphate, sodium phosphate, sodium chloride, calcium chloride, and others of similar composition. It is possible that some of the deposit may rub off or otherwise become attached or even incorporated into the filamentary article during its contact with the fusion surface. As a consequence, it should be apparent that the deposited salt should not be chemically injurious to the organic, thermoplastic material. For example, one would not be expected to use a strong basic salt as the release surface with the normally crystalline vinylidene chloride polymers, since such bases are known to have a detrimental effect on the stability of the polymer. It is preferred to use a salt which is compatible and, if possible, also beneficial to the polymer. For example, monosodium phosphate is known to be a thermal stabilizer for the normally crystalline vinylidene chloride polymers. Thus, if any should rub off it would be beneficial or at least not detrimental to the polymer.

The crystals deposited on the surface must be individually small. As a general guide, the individual crystals should be of the order of 0.01 inch or less. When larger crystals are deposited, they have a greater tendency to be loosened from the deposit and such large crystals have been found to be inefficient in the function of releasing organic, thermoplastic materials. The size of the inorganic crystals is dependent on the material being deposited, the concentration of solution from which deposited, and the rate of evaporation of solvent from the deposit. In general, the higher the rate of evaporation the larger will be the resulting crystals.

The coating or deposit should be as thin and of as uniform depth as possible and still have complete coverage of the surface. It is desirable to have the deposit about the thickness or depth of a single layer of tightly packed crystals. Thus, the layer should be in the range of from about 0.0001 to 0.01 inch in thickness. Although deposits of greater thickness are operable, it is necessary to build up such deposits in layers since the individual crystal size must not exceed 0.01 inch. Such techniques are time consuming and impractical. Also, thick deposits of the crystals retard the heat transfer characteristics of the surface.

The claimed concept of the present invention is illustrated in the appended drawing which shows a cylindrical fusion drum having the required deposit.

The deposit of this invention may be applied by known means. It is particularly convenient to spray the surface with a dilute aqueous solution of the salt. The deposit should be of substantially constant thinness so that the wet undried coating will not run during coating or drying. To prevent or at least minimize such problems there should be used an extremely fine mist for spraying the fusion drum or device to be coated. Other known techniques for depositing liquid solutions in relatively constant depth may be used. As a general rule of thumb, it has been found that when using spraying means under about 40 pounds' pressure with an atomizing nozzle, an aqueous solution containing from about 5 to 15 percent concentration of salt will result in the desired deposit. Optimum conditions for the given technique used may be determined by simple preliminary experiment. Although the deposits will remain intact for several cycles or for reasonably long exposure, they will require replacement from time to time. When the surface is used in the fabrication of filamentary articles and other continuous forms, it has been found that the application of the claimed crystals to the article itself prior to passage over the deposit will continuously renew the surface.

The benefits and advantages of the present invention will be more apparent from the following illustrative example wherein all parts and percentages are by weight.

A solution of 5 percent monosodium phosphate in water was prepared. This solution was sprayed onto a warm steel drum 30 inches long and 10 inches in diameter. The drum was maintained at about 70° F. during spraying. The spraying was performed with a standard paint spray gun operated at an air pressure of 40 pounds and using an atomizing nozzle. During the spraying, the nozzle of the gun was kept about 20 inches from the surface sprayed. After coating the drum completely with the aqueous solution, the surface was examined to be sure that the salt had been deposited as small, individual crystals. The temperature of the drum was then slowly raised to 175° C. which was the temperature to be used in the fusion technique for which the coated drum was intended.

Dried, unfused microporous coagula prepared from a copolymer of about 97 percent vinylidene chloride and 3 percent acrylonitrile and having a width of about ⅜ inch and a thickness of about 0.002 inch were brought in contact with the drum, retained in contact with the drum through about ½ revolution, and stripped therefrom. No adherence or sticking of the resulting microtapes to the drum was observed.

By way of contrast, when the drum was coated with several conventional silicone compounds sold commercially as mold release agents, the microtapes were not readily removed from the drum and much adherence thereto was noticed. The same ineffective results were noticed when the fusion drum was coated with a continuous, coherent coating of polytetrafluoroethylene.

Similar results were observed when the copolymer employed was one of about 96 percent vinylidene chloride and 4 percent ethyl acrylate.

In addition, the same comparison of results was noted when the drum was coated with a fused coating of polytetrafluoroethylene. When used without further treatment, the filaments exhibited a strong tendency to stick to the drum. When treated according to this example, however, the filaments exhibited no tendency to stick.

When the contrasting mold release agents mentioned above were attempted to be used with this coated drum, the agents would not wet the coating and could not be used.

What is claimed is:

1. A device having a surface to which dry organic, thermoplastic materials are non-adherent, said surface being of polytetrafluoroethylene completely covered with a thin, adherent deposit of from 0.001 to 0.01 inch in thickness, said deposit composed of small crystals of individual size no greater than 0.01 inch of a water-soluble, crystalline, inorganic salt.

2. The device claimed in claim 1 wherein said water-soluble, crystalline, inorganic salt is an alkali metal phosphate.

3. The device claimed in claim 2 wherein said alkali metal phosphate is monosodium phosphate.

4. A method for imparting plastic release characteristics to a solid polytetrafluoroethylene surface by depositing on said surface an adherent deposit of from 0.001 to 0.01 inch in thickness of small crystals of individual size no greater than 0.01 inch of a water-soluble, crystalline, inorganic salt practically covering said surface.

5. The method claimed in claim 4 wherein said water-soluble, crystalline, inorganic salt is monosodium phosphate.

References Cited in the file of this patent

UNITED STATES PATENTS

| | | |
|---|---|---|
| 2,272,847 | Macht | Feb. 10, 1942 |
| 2,488,446 | Swiss | Nov. 15, 1949 |
| 2,879,169 | Teicher | Mar. 24, 1959 |